Patented June 7, 1932

1,862,361

UNITED STATES PATENT OFFICE

MAX DOHRN, OF BERLIN-CHARLOTTENBURG, AND PAUL DIEDRICH, OF BERLIN-NEU-FINKENKRUG, GERMANY, ASSIGNORS TO SCHERING-KAHLBAUM A. G., OF BERLIN, GERMANY

COMPOUNDS OF HETEROCYCLIC AZO DERIVATIVES AND PROCESS OF MAKING THEM

No Drawing. Application filed December 3, 1929, Serial No. 411,385, and in Germany December 11, 1928.

Our invention refers to new chemical products of therapeutical value and more especially to heterocyclic azoderivatives.

We have found that azocompounds of the heterocyclic series, in which both by the azo-group connected nuclei are heterocyclic compounds such as pyridine or quinoline, possess a high therapeutical value. These azocompounds can be obtained by coupling a diazotized heterocyclic compound with a mono- or diaminopyridine or a derivative thereof. These compounds correspond to the formula:

$$R_1-N=N-R_2$$

wherein $R_1$ is a substituted or nonsubstituted pyridine or quinoline nucleus and $R_2$ a substituted or nonsubstituted monoamino- or diaminopyridine nucleus. They are dark coloured substances which form with mineral acids water soluble salts.

*Example 1.*—12,9 grams 2-chloro-5-aminopyridine are diazotized in hydrochloric acid solution with 6,9 gr. sodium nitrite. By adding a solution of 10,9 grams 2,6-diaminopyridine there separates out the hydrochloride of 2,6-diamino-2'-chloro-3,5'-azopyridine. The hydrochloride is dissolved in a large quantity of diluted hydrochloric acid. From this solution the 2,6-diamino-2'-chloro-3,5'-pyridine is precipitated by adding a solution of sodium carbonate. The deposit is recrystallized from alcohol or aqueous pyridine. It forms long light brown needles which melt at 242° C. The compound corresponds to the formula:

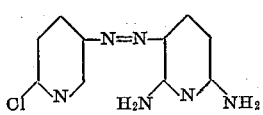

*Example 2.*—15,1 grams 2-acetylamino-5-aminopyridine are diazotized in sulphuric acid solution. To the solution of the diazoniumsalt a solution of 10,9 grams 2,6-diaminopyridine is added. The precipitated compound is dissolved in boiling water. After cooling the sulphate of 2,6-diamino-2'-acetylamino-3,5'-azopyridine crystallizes in yellowish brown needles arranged in the form of stars which melt at 253° C. under decomposing and corresponds to the formula:

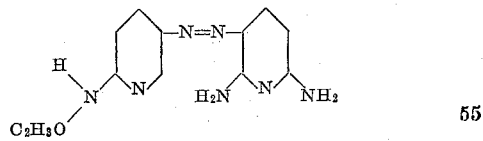

By treating with alcoholic potash lye the 2,6-diamino-2'-amino-3,5'-azopyridine is obtained, which can be recrystallized from diluted alcohol. It forms brown needles which melt at 260° C. and are readily soluble in mineral acids. The compound has the formula:

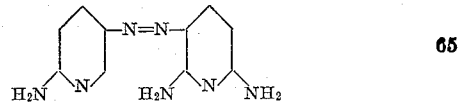

*Example 3.*—By diazotizing 18,8 grams 6-ethoxy-5-aminoquinoline in hydrochloric acid solution and coupling with 10,9 grams 2,6-diaminopyridine a solution of the hydrochloride of 6-ethoxy-2',6'-diamino-3'-pyridyl-5-azoquinoline is obtained from which the base is precipitated by means of ammonia. The compound can be recrystallized from alcohol and forms red needles which melt at 239° C. and are readily soluble in water. The compound corresponds to the formula:

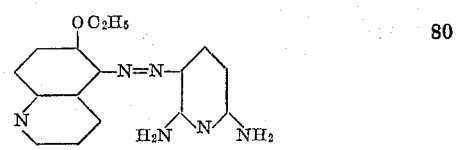

*Example 4.*—14,4 grams 6-aminoquinoline are diazotized in hydrochloric acid solution. After coupling with 10,9 grams diaminopyridine 2,6-diamino-3-pyridyl-6'-azoquinoline is obtained which can be precipitated with a solution of sodium carbonate. The compound can be recrystallized from alcohol of 80 percent in the form of orange coloured rhombohedrons, which melt at 203° C. and are readily soluble in mineral acids. The compound corresponds to the formula:

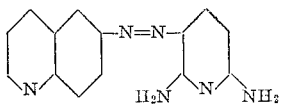

*Example 5.*—12,9 grams 2-chloro-5-aminopyridine are diazotized in diluted hydrochloric acid solution and treated with a solution of 15,1 grams 2-acetylamino-5-aminopyridine. The red solution is filtered and the 2-chloro-2′-acetylamino-5′-amino-3′,5-azopyridine is precipitated with alkali. The deposit is recrystallized from alcohol. The 2-chloro-2′-acetylamino-5′-amino-3′,5-azopyridine decomposes on heating at about 160° C., and is readily soluble in mineral acids with a red colour. The compound has the formula:

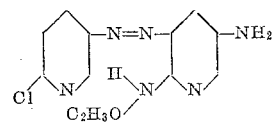

*Example 6.*—14,7 grams 2-hydroxy-5-aminopyridine-hydrochloride in aqueous solution are diazotized with 6,9 grams sodium nitrite and coupled with 10,9 grams 2,6-diaminopyridine. The hydrochloride of 2,6-diamino-2′-hydroxy-3,5′-azopyridine separates out, which by adding ammonia can be converted into the base, which after the recrystallization from pyridine forms dark reddish-brown needles, which decompose at 290° C. The compound corresponds to the formula:

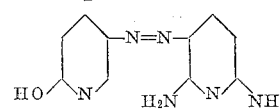

*Example 7.*—17,5 grams 2-ethoxy-5-aminopyridine-hydrochloride (prepared by the action of sodium ethylate on 2-chlor-5-nitropyridine and subsequent reduction of the 2-ethoxy-5-nitropyridine of melting point 96° C., with stannous chloride) are diazotized and coupled with 10,9 grams 2,6-diamino-pyridine. By adding ammonia the base is precipitated which can be recrystallized from diluted alcohol. The 2,6-diamino-2′-ethoxy-3,5′-azopyridine forms lustrous red leaflets which melt at 181° C. and correspond to the formula:

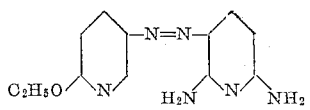

*Example 8.*—If 17,5 grams 2-exthoxy-3-aminopyridine-hydrochloride are diazotized and coupled with 2,6-diamino-pyridine the hydrochloride of 2,6-diamino-2′-ethoxy-3,3′-azopyridine is obtained. The base can be precipitated with ammonia. After recrystallization from alcohol it forms bright red lustrous needles, which melt at 154° C. The compound has the formula:

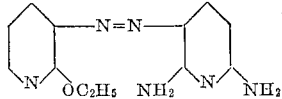

*Example 9.*—23 grams butyloxy-5-aminopyridine-hydrochloride (obtainable by working with sodium butylate on 2-chloro-5-nitropyridine in ethereal solution and reducing the thus obtained 2-butyloxy-5-nitropyridine of the boiling point 153° C. under 14 mm. pressure with stannous chloride) are diazotized and coupled with 10,9 grams diaminopyridine. By adding ammonia 2,6-diamino-2′-butyloxy-3,5′-azopyridine is precipitated which after recrystallization from alcohol forms reddish-brown needles of the melting point 129° C. The compound has the formula:

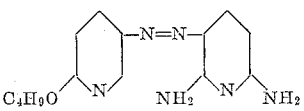

*Example 10.*—12,9 grams 2-chloro-5-aminopyridine are diazotized and allowed to interact with a hydrochloric acid solution of 18,8 grams 2,6-diamino-3-bromo-pyridine (obtained by treating 2,6-diaminopyridine with bromine. It melts at 176° C.). By adding ammonia the 2,6-diamino-3-brom-2′-chloro-5,5′-azopyridine, having the formula:

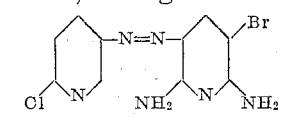

is precipitated. After recrystallization from alcohol it forms orange needles which melt at 255° C. under decomposition.

*Example 11.*—12,9 grams 2-chloro-5-aminopyridine are diazotized and coupled by adding a solution of 14,7 grams 2-hydroxy-5-aminopyridine hydrochloride. From the deep violet solution the base is precipitated by means of ammonia. After recrystallization from alcohol it forms black-brown needles, which decompose at 195° C. With alkalies and mineral acids the 2-hydroxy-5-amino-2′-chloro-3,5′-azopyridine gives blood red solutions, it corresponds to the formula:

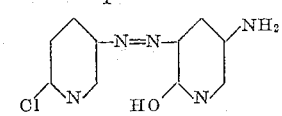

*Example 12.*—22 grams 2-iodo-5-aminopyridine are diazotized in hydrochloric acid solution and to the solution of the diazonium-hydrochloride a hydrochloric acid solution of 23,5 grams 2,6-diamino-5-iodopyridine is added. By adding ammonia 2,3′-diiodo-2′,6′-diamino-5,5′-azopyridine is precipitated. It forms red microcrystalline needles of melting point 224–225° C., which in mineral acids are soluble only with difficulty. The compound has the formula:

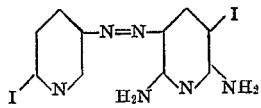

Various changes may be made in the details disclosed in the foregoing specification without departing from the invention or sacrificing the advantages thereof.

We claim:

1. As new products heterocyclic azocompounds of the formula:

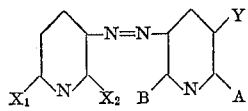

wherein A is a hydrogen atom or the aminogroup, B a hydrogen atom or the hydroxygroup or the amino, or a mono-acylated amino-group, Y a hydrogen atom or the aminogroup or a halogen atom, $X_1$ a hydrogen atom or a halogen atom or the hydroxy- or alkoxygroup or a monoacylated or nonacylated aminogroup, and $X_2$ hydrogen or an alkoxygroup, which products are dark-coloured substances and form with mineral acids water soluble salts.

2. As new products heterocyclic azocompounds of the formula:

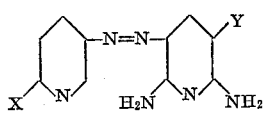

wherein Y is a halogen atom or a hydrogen atom, and X a halogen atom or the hydroxygroup or an alkoxygroup, which products are dark coloured substances and form with mineral acids water soluble salts.

3. As new products heterocyclic compounds of the formula:

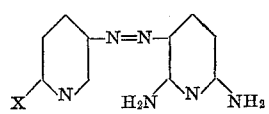

wherein X is a halogen atom or an alkoxy- or the hydroxy- or the aminogroup, which products are dark coloured substances and form with mineral acids water soluble salts.

4. As new products the 2,6-diamino-2'-alkoxy-3,5'-azopyridines of the formula:

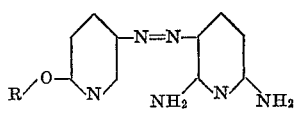

wherein R is an alkygroup which products are dark coloured substances and form with mineral acids water soluble salts.

5. As a new product the 2,6-diamino-2'-butyloxy-3,5'-azopyridine of the formula:

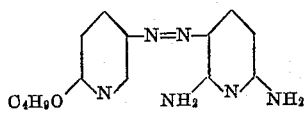

which forms reddish-brown needles of the melting point of about 129° C.

6. Process for the production of heterocyclic azocompounds comprising diazotizing an aminosubstituted heterocyclic compound of a group consisting of pyridine and quinoline and coupling the diazoniumsalt with an aminopyridine.

7. Process for the production of heterocyclic azocompounds comprising diazotizing an aminosubstituted heterocyclic compound of a group consisting of pyridine and quinoline and coupling the diazoniumsalt with a diaminopyridine.

8. Process for the production of 2,6 diamino-2'-alkoxy-3,5'-azopyridine comprising diazotizing a 2-alkoxy-5-aminopyridine and coupling the diazoniumsalt with 2,6-diaminopyridine.

9. Process for the production of 2,6-diamino-2'-butyloxy-3,5'-azopyridine comprising diazotizing 2-butyloxy-5-aminopyridine and coupling the diazoniumsalt with 2,6-diaminopyridine.

10. As a new product heterocyclic azocompounds of the formula:

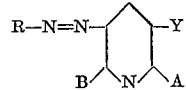

wherein R is a quinoline or pyridine nucleus, which may be nonsubstituted or be substituted by the acylated or non-acylated aminogroup, the hydroxlgroup, the alkoxygroup or a halogen atom, and where A is a hydrogen atom or the aminogroup, B a hydrogen atom or the hydroxygroup or the amino- or a mono-acylated aminogroup, and Y a hydrogen atom or the aminogroup or a halogen atom, which products are dark coloured substances and form with mineral acids water soluble salts.

MAX DOHRN.
PAUL DIEDRICH.